US009012537B2

(12) United States Patent
Takasaki et al.

(10) Patent No.: US 9,012,537 B2
(45) Date of Patent: Apr. 21, 2015

(54) PROCESS FOR PRODUCING POLYIMIDE SILOXANE SOLUTION COMPOSITION, AND POLYIMIDE SILOXANE SOLUTION COMPOSITION

(75) Inventors: Susumu Takasaki, Ube (JP); Hiroo Yamashita, Ube (JP); Seiichirou Takabayashi, Ube (JP); Tomoko Hayashida, Ube (JP); Mitsuo Yamanaka, Ube (JP); Takafumi Hirakawa, Ube (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 325 days.

(21) Appl. No.: 13/390,691

(22) PCT Filed: Aug. 17, 2010

(86) PCT No.: PCT/JP2010/063887
§ 371 (c)(1),
(2), (4) Date: Mar. 7, 2012

(87) PCT Pub. No.: WO2011/021628
PCT Pub. Date: Feb. 24, 2011

(65) Prior Publication Data
US 2012/0157574 A1    Jun. 21, 2012

(30) Foreign Application Priority Data
Aug. 18, 2009  (JP) ................................ 2009-189312

(51) Int. Cl.
C08G 73/10    (2006.01)
C08L 83/00    (2006.01)
C08G 77/455   (2006.01)
C08L 79/08    (2006.01)
C08L 83/10    (2006.01)

(52) U.S. Cl.
CPC ............... *C08G 73/106* (2013.01); *C08L 79/08* (2013.01); *C08G 77/455* (2013.01); *C08L 83/10* (2013.01)

(58) Field of Classification Search
CPC .................................. C08L 83/04; C08L 83/08
USPC .......................................... 523/435; 524/755
See application file for complete search history.

(56) References Cited

U.S. PATENT DOCUMENTS

| 5,643,986      | A  |   | 7/1997  | Ishikawa et al. |
|----------------|----|---|---------|-----------------|
| 2004/0019174   | A1 |   | 1/2004  | Ichiroku et al. |
| 2006/0091548   | A1 |   | 5/2006  | Naiki et al.    |
| 2007/0185286   | A1 |   | 8/2007  | Hayashi et al.  |

FOREIGN PATENT DOCUMENTS

| CN | 1942524    | A |   | 4/2007  |
|----|------------|---|---|---------|
| JP | H5-156231  |   |   | 6/1993  |
| JP | 08253667   | A | * | 10/1996 |
| JP | H08-253677 |   |   | 10/1996 |
| JP | 10095961   | A | * | 4/1998  |
| JP | 2000226566 | A | * | 8/2000  |
| JP | 2004-035650|   |   | 2/2004  |
| JP | 2006-156949|   |   | 6/2006  |
| JP | 2008-095113|   |   | 4/2008  |
| JP | 2008095113 | A | * | 4/2008  |

OTHER PUBLICATIONS

Chinese Office Action mailed Feb. 7, 2013 in a counterpart Chinese Application No. 201080047031.2 (Chinese and English translation).
International Preliminary Report on Patentability (Chapter I) dated Mar. 22, 2012 and Written Opinion dated Nov. 16, 2010 in International Application No. PCT/JP2010/063887.
International Search Report in International Application No. PCT/JP2010/063887.

* cited by examiner

*Primary Examiner* — Randy Gulakowski
*Assistant Examiner* — Ha Nguyen
(74) *Attorney, Agent, or Firm* — Nixon Peabody LLP; Jeffrey L. Costellia

(57) ABSTRACT

There may be provided a process for producing a polyimide siloxane solution composition having a further improved long-term viscosity stability; and a polyimide siloxane solution composition. In the process for producing the polyimide siloxane solution composition by polymerizing/imidizing a tetracarboxylic acid component and a diamine component consisting of (a) a diaminopolysiloxane, (b) a diamine having a polar group and (c) a diamine other than (a) and (b) in a solvent, the tetracarboxylic acid component and the diamine component excluding (b) the diamine having a polar group are polymerized/imidized to provide a reaction mixture solution, and then (b) the diamine having a polar group is added to the reaction mixture solution last, and the mixture is polymerized/imidized.

12 Claims, No Drawings

PROCESS FOR PRODUCING POLYIMIDE SILOXANE SOLUTION COMPOSITION, AND POLYIMIDE SILOXANE SOLUTION COMPOSITION

TECHNICAL FIELD

The present invention relates to a process for producing a polyimide siloxane solution composition by polymerizing/imidizing a tetracarboxylic acid component and a diamine component consisting of (a) a diaminopolysiloxane, (b) a diamine having a polar group and (c) a diamine other than (a) and (b); and a polyimide siloxane solution composition.

BACKGROUND ART

Patent Reference 1 and Patent Reference 2 disclose a polyimide siloxane solution composition, which is prepared by polymerizing/imidizing a tetracarboxylic acid component and a diamine component consisting of (a) a diaminopolysiloxane, (b) a diamine having a polar group and (c) a diamine other than (a) and (b).

The polyimide siloxane solution composition may comprise a curable component such as an epoxy compound and a polyvalent isocyanate compound, in addition to a polyimide siloxane, and may be suitably used for the formation of a cured insulating film for electronic parts; for example, the polyimide siloxane solution composition may be applied to a flexible wiring board by screen printing, and then be cured.

Meanwhile, it is required that a polymer solution composition have a long-term viscosity stability (storage stability) for practical use. A solution composition of a polymer having an inadequate solubility such as a polyimide, a solution composition of a polymer having a polar group, and a solution composition having a high polymer solid content, however, is apt to have problems associated with viscosity stability. A further improvement in viscosity stability has been required for a polyimide siloxane solution composition.

CITATION LIST

Patent References

Patent Reference 1: JP-A-H08 (1996)-253677
Patent Reference 2: JP-A-2006-156949

SUMMARY OF INVENTION

Problems to be Solved by the Invention

An objective of the present invention is to provide a process for producing a polyimide siloxane solution composition having further improved long-term viscosity stability; and a polyimide siloxane solution composition having further improved long-term viscosity stability.

Means for Solving the Problems

That is to say, the present invention relates to the following items.

[1] A process for producing a polyimide siloxane solution composition by polymerizing/imidizing a tetracarboxylic acid component and a diamine component consisting of (a) a diaminopolysiloxane, (b) a diamine having a polar group and (c) a diamine other than (a) and (b) in a solvent, comprising steps of:

polymerizing/imidizing the tetracarboxylic acid component and the diamine component excluding (b) the diamine having a polar group [i.e. (a) the diaminopolysiloxane and (c) the diamine other than (a) and (b)] to provide a reaction mixture solution; and adding (b) the diamine having a polar group last to the reaction mixture solution, and polymerizing/imidizing the mixture.

[2] A process for producing a polyimide siloxane solution composition as described in [1], wherein the polyimide siloxane solution composition obtained has a solid content of 20 wt % or more, preferably 25 wt % or more, more preferably 30 wt % or more, particularly preferably 35 wt % or more.

[3] A process for producing a polyimide siloxane solution composition as described in [1] or [2], wherein the polar group in (b) the diamine having a polar group is carboxyl group or hydroxyl group.

[4] A process for producing a polyimide siloxane solution composition as described in any one of [1] to [3], wherein (c) the diamine other than (a) and (b) is an aromatic diamine having a plurality of benzene rings.

[5] A polyimide siloxane solution composition produced by a production process as described in any one of [1] to [4].

[6] A polyimide siloxane solution composition comprising a polyimide siloxane, which is prepared by polymerizing/imidizing a tetracarboxylic acid component and a diamine component consisting of (a) a diaminopolysiloxane, (b) a diamine having a polar group and (c) a diamine other than (a) and (b), and a solvent; wherein the polyimide siloxane solution composition has a polyimide siloxane solid content of from 30 wt % to 60 wt %; and the polyimide siloxane solution composition has a percentage change in viscosity of less than ±9% when the viscosity is measured after the composition is left at a temperature of 25° C. for 30 days from the point of production, this percentage being expressed relative to the viscosity measured after the composition is left at a temperature of 25° C. for 1 day from the point of production.

[7] A polyimide siloxane solution composition comprising a polyimide siloxane, which is prepared by polymerizing/imidizing a tetracarboxylic acid component and a diamine component consisting of (a) a diaminopolysiloxane, (b) a diamine having a polar group and (c) a diamine other than (a) and (b), and a solvent; wherein the polyimide siloxane solution composition has a polyimide siloxane solid content of from 30 wt % to 60 wt %; and the polyimide siloxane solution composition has an absolute value of the change in viscosity of less than 5 Pa·s when the viscosity is measured after the composition is left at a temperature of 25° C. for 30 days from the point of production, this absolute value being expressed relative to the viscosity measured after the composition is left at a temperature of 25° C. for 1 day from the point of production.

[8] A curable polyimide siloxane solution composition comprising a polyimide siloxane solution composition as described in any one of [5] to [7], and a curable resin.

[9] A curable polyimide siloxane solution composition as described in [8], wherein the curable resin is at least one selected from the group consisting of an epoxy resin, a polyvalent isocyanate, a phenol resin and a guanamine resin.

Effect of the Invention

A polyimide siloxane solution composition having a further improved long-term viscosity stability may be produced by a process for producing a polyimide siloxane solution composition according to the present invention. The polyimide siloxane solution composition may be suitably used in various applications; for example, the polyimide siloxane solution composition may be applied to a flexible wiring board by screen printing, and then be cured to form a cured insulating film for electronic parts.

DESCRIPTION OF EMBODIMENTS

A process for producing a polyimide siloxane solution composition according to the present invention relates to a process for producing a polyimide siloxane solution composition by polymerizing/imidizing a tetracarboxylic acid component and a diamine component consisting of (a) a diaminopolysiloxane, (b) a diamine having a polar group and (c) a diamine other than (a) and (b) in a solvent.

The solvent to be used for the reaction may be preferably an organic polar solvent having a good solubility, although any solvent may be used, without limitation, so long as the solvent may provide a solvent environment suitable for polymerizing/imidizing a tetracarboxylic acid component and a diamine component to provide a polyimide siloxane. Examples of the organic polar solvent include nitrogen-containing solvents such as N,N-dimethylacetamide, N,N-diethylacetamide, N,N-dimethylformamide, N,N-diethylformamide, N-methyl-2-pyrrolidone, 1,3-dimethyl-2-imidazolidinone and N-methylcaprolactam; solvents containing a sulfur atom such as dimethyl sulfoxide, diethyl sulfoxide, dimethyl sulfone, diethyl sulfone and hexamethyl sulfolamide; phenol solvents such as cresol, phenol and xylenol; diglyme solvents such as diethylene glycol dimethyl ether (diglyme), triethylene glycol dimethyl ether (triglyme) and tetraglyme; solvents containing an oxygen atom in the molecule such as acetone, methanol, ethanol, ethylene glycol, dioxane, isophorone and tetrahydrofuran; lactone solvents such as γ-butyrolactone and γ-valerolactone; and other solvents such as pyridine and tetramethylurea. These solvents may be used in combination with aromatic hydrocarbon solvents such as benzene, toluene and xylene, and other organic solvents such as solvent naphtha and benzonitrile, as necessary.

Preferable examples of the tetracarboxylic acid component include aromatic tetracarboxylic acids such as 2,3,3',4'-biphenyltetracarboxylic acid, 3,3',4,4'-biphenyltetracarboxylic acid, 2,2',3,3'-biphenyltetracarboxylic acid, 3,3',4,4'-diphenylether tetracarboxylic acid, 3,3',4,4'-diphenylsulfone tetracarboxylic acid, 3,3',4,4'-benzophenone tetracarboxylic acid, 2,2-bis(3,4-benzenedicarboxylic acid)hexafluoropropane, pyromellitic acid, 1,4-bis(3,4-benzenedicarboxylic acid)benzene, 2,2-bis[4-(3,4-phenoxydicarboxylic acid)phenyl]propane, 2,3,6,7-naphthalene tetracarboxylic acid, 1,2,5,6-naphthalene tetracarboxylic acid, 1,2,4,5-naphthalene tetracarboxylic acid, 1,4,5,8-naphthalene tetracarboxylic acid and 1,1-bis(2,3-dicarboxyphenyl)ethane, dianhydrides thereof, and lower alcohol esters thereof; and alicyclic tetracarboxylic acids such as cyclopentane tetracarboxylic acid, 1,2,4,5-cyclohexane tetracarboxylic acid and 3-methyl-4-cyclohexene-1,2,4,5-tetracarboxylic acid, dianhydrides thereof, and lower alcohol esters thereof. A tetracarboxylic dianhydride, which may be readily reacted with a diamine, may be suitably used as the tetracarboxylic acid component.

The diamine component consists of (a) a diaminopolysiloxane, (b) a diamine having a polar group and (c) a diamine other than (a) and (b).

Any diamine compound having a silylene skeleton in the molecule may be used, without limitation, as (a) the diaminopolysiloxane. The diaminopolysiloxane may be preferably a diamine compound represented by the following formula (1):

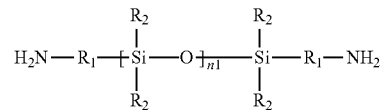

In the formula (1), each $R_1$ represents a divalent aliphatic or aromatic hydrocarbon group, each $R_2$ independently represents a monovalent aliphatic or aromatic hydrocarbon group, and n1 represents an integer of from 2 to 50. $R_1$ may be preferably an alkylene group having 1 to 6 carbon atoms, or phenylene group, which may optionally have a substituent [with the proviso that the substituent will not be involved in the reaction; the substituent may be an alkyl group (which preferably has 1 to about 4 carbon atoms) or a halogen atom, for example.]. $R_1$ may be particularly preferably propylene group. Two $R_1$s may be the same, or may be different from each other, and two $R_1$s may be preferably the same. $R_2$ may be preferably an alkyl group having 1 to 5 carbon atoms, or phenyl group, and two $R_2$s present on Si may be different from each other. Although [$R_2$—Si—$R_2$]s may be different from each other, [$R_2$—Si—$R_2$]s may be preferably the same, in view of easier synthesis or availability. As for n1, n1 may be preferably from 3 to 50, particularly preferably from 3 to 20. The amino group in the diaminosiloxane may be protected with a protecting group. In the case where the diaminopolysiloxane is a mixture of two or more compounds, n1 may be calculated based on the amino equivalence.

Examples of (a) the diaminopolysiloxane include α,ω-bis(2-aminoethyl)polydimethylsiloxane, α,ω-bis(3-aminopropyl)polydimethylsiloxane, α,ω-bis(4-aminophenyl)polydimethylsiloxane, α,ω-bis(4-amino-3-methylphenyl)polydimethylsiloxane, α,ω-bis(3-aminopropyl)polydiphenylsiloxane, and α,ω-bis(4-aminobutyl)polydimethylsiloxane.

As for (b) the diamine having a polar group, it may be a diamine having a polar group such as hydroxyl group, amide group, carboxyl group and sulfonic group in the molecule. This diamine is introduced into a polyimide siloxane in order to allow the polyimide siloxane to curative react with another curable resin.

In order to provide a curable solution composition in combination with an epoxy resin or an isocyanate, for example, (b) the diamine having a polar group may be preferably, but not limited to, an aromatic diamine having a polar group capable of reacting with the epoxy resin or the isocyanate in the molecule, more preferably a diamine represented by the following formula (2):

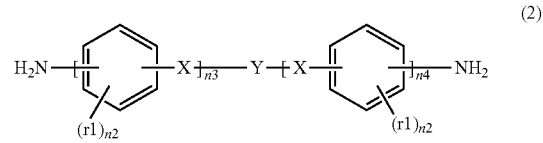

In the formula (2), each X and Y independently represents a direct bond, $CH_2$, $C(CH_3)_2$, $C(CF_3)_2$, O, a benzene ring or $SO_2$, r1 represents COOH or OH, n2 represents 1 or 2, and each n3 and n4 independently represents 0, 1 or 2, preferably 0 or 1, with the proviso that at least one of n3 and n4 represents 1 or 2.

Examples of the diamine represented by the formula (2) include diamine compounds having —OH group, for example, diaminophenol compounds such as 2,4-diaminophenol; hydroxybiphenyl compounds such as 3,3'-diamino-4,4'-dihydroxybiphenyl, 4,4'-diamino-3,3'-dihydroxybiphenyl, 4,4'-diamino-2,2'-dihydroxybiphenyl and 4,4'-diamino-2,2',5,5'-tetrahydroxybiphenyl; hydroxydiphenyl alkane compounds such as 3,3'-diamino-4,4'-dihydroxydiphenylmethane, 4,4'-diamino-3,3'-dihydroxydiphenylmethane, 4,4'-diamino-2,2'-dihydroxydiphenylmethane, 2,2-bis[3-amino-4-hydroxyphenyl]propane, 2,2-bis[4-amino-3-hydroxyphenyl]propane, 2,2-bis[3-amino-4-hydroxyphenyl]hexafluoropropane and 4,4'-diamino-2,2',5,5'-tetrahydroxydiphenylmethane; hydroxydiphenyl ether compounds such as 3,3'-diamino-4,4'-dihydroxydiphenylether, 4,4'-diamino-3,3'-dihydroxydiphenylether, 4,4'-diamino-2,2'-dihydroxydiphenylether and 4,4'-diamino-2,2',5,5'-tetrahydroxydiphenylether; hydroxydiphenyl sulfone compounds such as 3,3'-diamino-4,4'-dihydroxydiphenylsulfone, 4,4'-diamino-3,3'-dihydroxydiphenylsulfone, 4,4'-diamino-2,2'-dihydroxydiphenylsulfone and 4,4'-diamino-2,2',5,5'-tetrahydroxydiphenylsulfone; bis(hydroxyphenoxyphenyl)alkane compounds such as 2,2-bis[4-(4-amino-3-hydroxyphenoxy)phenyl]propane; bis(hydroxyphenoxy)biphenyl compounds such as 4,4'-bis(4-amino-3-hydroxyphenoxy)biphenyl; and bis(hydroxyphenoxyphenyl)sulfone compounds such as 2,2-bis[4-(4-amino-3-hydroxyphenoxy)phenyl]sulfone.

Examples of the diamine represented by the formula (2) also include diamine compounds having —COOH group, for example, benzenecarboxylic acids such as 3,5-diaminobenzoic acid and 2,4-diaminobenzoic acid; carboxybiphenyl compounds such as 3,3'-diamino-4,4'-dicarboxybiphenyl, 4,4'-diamino-3,3'-dicarboxybiphenyl, 4,4'-diamino-2,2'-dicarboxybiphenyl and 4,4'-diamino-2,2',5,5'-tetracarboxybiphenyl; carboxydiphenyl alkane compounds such as 3,3'-diamino-4,4'-dicarboxydiphenylmethane, 4,4'-diamino-3,3'-dicarboxydiphenylmethane, 4,4'-diamino-2,2'-dicarboxydiphenylmethane, 2,2-bis[3-amino-4-carboxyphenyl]propane, 2,2-bis[4-amino-3-carboxyphenyl]propane, 2,2-bis[3-amino-4-carboxyphenyl]hexafluoropropane and 4,4'-diamino-2,2',5,5'-tetracarboxybiphenyl; carboxydiphenyl ether compounds such as 3,3'-diamino-4,4'-dicarboxydiphenylether, 4,4'-diamino-3,3'-dicarboxydiphenylether, 4,4'-diamino-2,2'-dicarboxydiphenylether and 4,4'-diamino-2,2',5,5'-tetracarboxydiphenylether; carboxydiphenyl sulfone compounds such as 3,3'-diamino-4,4'-dicarboxydiphenylsulfone, 4,4'-diamino-3,3'-dicarboxydiphenylsulfone and 4,4'-diamino-2,2',5,5'-tetracarboxydiphenylsulfone; bis(carboxyphenoxyphenyl)alkane compounds such as 2,2-bis[4-(4-amino-3-carboxyphenoxy)phenyl]propane; bis(carboxyphenoxy)biphenyl compounds such as 4,4'-bis(4-amino-3-carboxyphenoxy)biphenyl; and bis(carboxyphenoxyphenyl)sulfone compounds such as 2,2-bis[4-(4-amino-3-carboxyphenoxy)phenyl]sulfone.

Any diamine other than (a) the diaminopolysiloxane and (b) the diamine having a polar group may be used, without limitation, as (c) the diamine other than (a) and (b). The diamine may be preferably an aromatic diamine having a plurality of benzene rings and represented by the following formula (3):

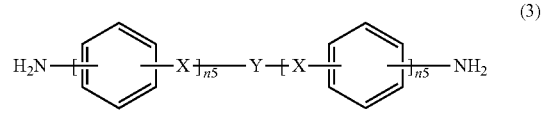

In the formula (3), each X and Y independently represents a direct bond, $CH_2$, $C(CH_3)_2$, $C(CF_3)_2$, O, a benzene ring or $SO_2$, and n5 represents 1 or 2. The phenylene ring in the formula (3) may be substituted with a halogen atom, an alkyl group (which preferably has 1 to about 4 carbon atoms) or the like.

Examples of the aromatic diamine represented by the formula (3) include diamine compounds, for example, diamines having one benzene ring such as 1,4-diaminobenzene, 1,3-diaminobenzene, 2,4-diaminotoluene and 1,4-diamino-2,5-dihalogenobenzene; diamines having two benzene rings such as bis(4-aminophenyl)ether, bis(3-aminophenyl)ether, bis(4-aminophenyl)sulfone, bis(3-aminophenyl)sulfone, bis(4-aminophenyl)methane, bis(3-aminophenyl)methane, bis(4-aminophenyl)sulfide, bis(3-aminophenyl)sulfide, 2,2-bis(4-aminophenyl)propane, 2,2-bis(3-aminophenyl)propane, 2,2-bis(4-aminophenyl)hexafluoropropane, o-dianisidine, o-tolidine and tolidine sulfonic acids; diamines having three benzene rings such as 1,4-bis(4-aminophenoxy)benzene, 1,4-bis(3-aminophenoxy)benzene, 1,4-bis(4-aminophenyl)benzene, 1,4-bis(3-aminophenyl)benzene, α,α'-bis(4-aminophenyl)-1,4-diisopropylbenzene and α,α'-bis(4-aminophenyl)-1,3-diisopropylbenzene; and diamines having four or more benzene rings such as 2,2-bis[4-(4-aminophenoxy)phenyl]propane, 2,2-bis[4-(4-aminophenoxy)phenyl]hexafluoropropane, 2,2-bis[4-(4-aminophenoxy)phenyl]sulfone, 4,4'-(4-aminophenoxy)biphenyl, 9,9-bis(4-aminophenyl)fluorene and 5,10-bis(4-aminophenyl)anthracene.

An aliphatic diamine compound such as hexamethylenediamine and diaminododecane may be used in combination with the diamine as described above.

In the present invention, substantially equimolar amounts of the tetracarboxylic acid component and the diamine component may be used. The amount of the tetracarboxylic acid component may be preferably from about 0.95 mole to about 1.2 mole, more preferably from about 1.0 mole to about 1.1 mole, per mole of the diamine component.

The diamine component to be used may preferably comprise 30 mol % to 90 mol %, more preferably 50 mol % to 90 mol %, of (a) the diaminopolysiloxane, 5 mol % to 65 mol %, more preferably 10 mol % to 60 mol %, of (b) the diamine having a polar group, and 5 mol % to 65 mol %, more preferably 10 mol % to 60 mol %, of (c) the diamine other than (a) and (b).

A process for producing a polyimide siloxane solution composition according to the present invention is a process for producing a polyimide siloxane solution composition by polymerizing/imidizing a tetracarboxylic acid component and a diamine component consisting of (a) a diaminopolysiloxane, (b) a diamine having a polar group and (c) a diamine other than (a) and (b) in a solvent, wherein (b) the diamine having a polar group is the last to be added to the reaction mixture, and the mixture is polymerized/imidized.

The term "polymerizing/imidizing" as used herein means that a tetracarboxylic acid component and a diamine component are reacted to form an imide ring, and, in turn, a polyimide backbone. Accordingly, any known method for polymerization/imidization may be preferably employed. For example, a tetracarboxylic acid component and a diamine component may be heated and polymerized/imidized in one step at a temperature of from about 100° C. to about 250° C. in a solvent. Alternatively, a tetracarboxylic acid component and a diamine component may be reacted at a temperature of about 100° C. or lower in a solvent to provide a polyimide precursor (polyamic acid), which may be then imidized by heat treatment at a temperature of from about 100° C. to about 250° C., or by the action of a chemical imidizing agent such as acetic anhydride/pyridine system and dicyclohexylcarbodiimide as a dehydrative cyclizing agent. The imidization reaction may be conducted, while removing co-produced water from the system, using an azeotropic agent such as toluene and xylene.

The process for producing the polyimide siloxane solution composition may comprise the following steps.

(Earlier step) The tetracarboxylic acid component and the diamine component excluding (b) the diamine having a polar group [i.e. (a) the diaminopolysiloxane and (c) the diamine other than (a) and (b)] are polymerized/imidized in a solvent.

(Later step) Subsequently, (b) the diamine having a polar group is added to the reaction mixture solution obtained in the earlier step, and the mixture is further polymerized/imidized.

In the earlier step, (a) the diaminopolysiloxane and (c) the diamine other than (a) and (b), which are the diamine component excluding (b) the diamine having a polar group, may be polymerized/imidized with the tetracarboxylic acid component separately (one by one) in separate steps, or alternatively, may be polymerized/imidized with the tetracarboxylic acid component simultaneously in one step. It may be preferred, in view of solubility, that (a) the diaminopolysiloxane, which has a higher solubility, is reacted with the tetracarboxylic acid component at first, and then (c) the diamine other than (a) and (b) is added to the reaction mixture and the reaction is further conducted. It is important that in the earlier step, the polymerization/imidization reaction should proceed until the reaction is substantially completed. When the imidization reaction does not fully proceed and an amic acid structure remains in the molecule, the polymer structure may not be retained in the later step, which is caused by hydrolysis, and the effect of the present invention may not be sufficiently achieved. The completion of imidization may be determined by observations of the amount of produced water (water is not found to be produced after the completion of imidization).

In the earlier step, a diamine component is reacted with an excess of a tetracarboxylic acid component. Accordingly, the polyimide siloxane (imide siloxane oligomer) thus obtained essentially has segments derived from the tetracarboxylic acid component at both its molecular terminal.

In the later step, (b) the diamine having a polar group is added to the reaction mixture solution obtained in the earlier step, and the mixture is further polymerized/imidized. In other words, in the later step, the polyimide siloxane (imide siloxane oligomer) having segments derived from the tetracarboxylic acid component at both its molecular terminal is reacted with (b) the diamine having a polar group. Consequently, with a high probability, there may be provided a polyimide siloxane, which has segments derived from (b) the diamine having a polar group attached (placed) at both its molecular terminal.

In the present invention, a polyimide siloxane may be preferably dissolved in a solvent in an amount of 3 wt % or more, preferably from 5 wt % to 60 wt %, more preferably from 20 wt % to 60 wt %, particularly preferably from 30 wt % to 60 wt % (as solid content). A solution composition having a higher solid content is generally apt to have problems associated with viscosity stability. Accordingly, the present invention may provide more remarkably the effect of improving long-term viscosity stability when the solution composition has a higher solid content. Meanwhile, when the solid content of the polyimide siloxane solution composition is more than 60 wt %, the polyimide siloxane solution composition may have a higher viscosity and may be generally difficult to handle, which result in poor workability. The polyimide siloxane solution composition may preferably have a solution viscosity (type E rotational viscosity) at 25° C. of from 0.1 Pa·sec to 1000 Pa·sec, more preferably from 0.1 Pa·sec to 100 Pa·sec. The polyimide siloxane solution composition may preferably have a logarithmic viscosity (Concentration under measurement: 0.5 g/100 mL; Solvent: N-methyl-2-pyrrolidone; Temperature under measurement: 30° C.), which is used as an index of the molecular weight of the polyimide siloxane, of 0.15 or higher, more preferably from 0.16 to 2.

The "solid content (concentration)" and "viscosity" of the polyimide siloxane solution composition as used herein are not to include a filler nor any other additives.

The solution composition of the present invention comprises, as essential components, a polyimide siloxane which is prepared as described above, and a solvent, and may suitably comprise various components depending on the intended use. Thus, a polyimide siloxane solution composition comprising a filler and/or any other additives is also within the scope of the present invention, regardless of the definition of "solid content (concentration)" and "viscosity" of the polyimide siloxane solution composition.

The solvent in the polyimide siloxane solution composition may be preferably a solvent which may be used for the production of the polyimide siloxane.

A curable component such as an epoxy resin, a polyvalent isocyanate, a phenol resin and a guanamine resin, which are employed in a common curable resin composition, may be suitably used to provide a curable solution composition.

In addition, an organic or inorganic filler, a pigment, an anti-foaming agent and the like may be suitably used.

That is to say, depending on the intended use, any known curable component, filler and/or other additives, as described in Patent References 1 and 2, for example, may be suitably used for the polyimide siloxane solution composition of the present invention.

A polyimide siloxane solution composition produced by a production process according to the present invention may have an excellent long-term viscosity stability. Thus, the present invention also relates to a polyimide siloxane solution composition having an excellent long-term viscosity stability.

That is to say, another aspect of the present invention relates to a polyimide siloxane solution composition, which comprises a polyimide siloxane prepared by polymerizing/imidizing a tetracarboxylic acid component and a diamine component consisting of (a) a diaminopolysiloxane, (b) a diamine having a polar group and (c) a diamine other than (a) and (b), and a solvent, and has a polyimide siloxane solid content of from 30 wt % to 60 wt %, and has a little change in viscosity for an extended period of time after production.

The change in viscosity may be evaluated, as one index, by measuring the viscosity of the polyimide siloxane solution composition after storage at a temperature of 25° C. for 30 days from the point of production, which is compared with the viscosity measured after storage at a temperature of 25° C. for 1 day from the point of production. (See Examples for the measuring method.) According to one aspect of the present invention, a polyimide siloxane solution composition has a solid content of from 30 wt % to 60 wt %, preferably from 40 wt % to 60 wt %, and has a percentage change in viscosity of less than ±9%, preferably 5% or less, more preferably 2% or less, when the viscosity is measured after 30 days, this percentage being expressed relative to the viscosity measured after 1 day.

According to another aspect of the present invention, a polyimide siloxane solution composition has a solid content of from 30 wt % to 60 wt %, preferably from 40 wt % to 60 wt %, and has an absolute value of the change in viscosity of preferably less than 5 Pa·s, more preferably 3 Pa·s or less, when the viscosity is measured after 30 days, this absolute value being expressed relative to the viscosity measured after 1 day.

A curable polyimide siloxane solution composition according to the present invention may be a solution composition prepared by adding at least a curable resin (curable component) such as an epoxy resin, a polyvalent isocyanate, a phenol resin and a guanamine resin, which are employed in a common curable resin composition, to the polyimide siloxane solution composition. The curable solution composition may have an excellent stability of the solution viscosity.

EXAMPLES

The present invention will be described in more detail below with reference to the specific examples. However, the present invention is not limited to the following examples.

The compounds used as the starting materials are as follows.

a-BPDA: 2,3,3',4'-biphenyltetracarboxylic dianhydride
DAPSi: α, ω-bis(3-aminopropyl)polydimethylsiloxane (amino equivalence: 422)
BAPP: 2,2-bis[4-(4-aminophenoxy)phenyl]propane
DABA: 3,5-diaminobenzoic acid
MBAA: 3,3'-dicarboxy-4,4'-diaminodiphenylmethane
(Method for Determining the Carboxylic Acid Equivalence)

To the predetermined amounts of a sample solution, which was prepared by dissolving a polyimide siloxane solution in THF solvent, or a blank sample solution which does not contain the polyimide siloxane solution (THF solvent) were added an appropriate amount of a phenolphthalein solution, and then a 0.01 mol/L KOH solution (ethanol solution) to conduct neutralization titration. The carboxylic acid equivalence was calculated by the following formula.

COOH group (eq/g)=[(t1−t2)×0.01×F/X]/1000 t1: the KOH solution titer for the sample solution (mL)
t2: the KOH solution titer for the blank sample solution (mL)
F: factor of the KOH solution
S: the amount of the polyimide siloxane in the sample solution (g)
Carboxylic acid equivalence (g/eq)=1/COOH group
(Method for Determining the Solid Content)

A sample solution composition was heated at 120° C. for 10 min, and then at 250° C. for 60 min. The solid content was calculated by the following formula from the weight of the sample before heat treatment (W1) and the weight of the sample after heat treatment (W2).

Solid Content (%)=[W2/W1]×100

(Method for Determining the Solution Viscosity)
The solution viscosity was measured at 25° C. and 10 rpm, using a type E rotational viscometer.
(Determination of the Viscosity Stability)
The solution viscosity was measured after the sample was left at 25° C. for the predetermined period of time.

(Thixo Ratio)
The solution viscosity was measured at 25° C. and 1 rpm, or 10 rpm, using a type E rotational viscometer. The thixo ratio was calculated by the following formula.

Thixo ratio=(Solution viscosity at 1 rpm)/(Solution viscosity at 10 rpm)

Example 1

In a 500 mL glass separable flask were placed 59.43 g (202.0 mmol) of a-BPDA and 170.0 g of triglyme as a solvent. And then, a-BPDA was dissolved in the solvent at room temperature under a nitrogen stream. After the resulting mixture was heated up to 80° C., 114.8 g (140.0 mmol) of DAPSi and 35.0 g of triglyme were added to the mixture. The resulting mixture was stirred for 1 hour, and then heated up to 170° C., and stirred for 6 hours at the temperature while removing water. Subsequently, 12.32 g (30.0 mmol) of BAPP and 35.0 g of triglyme were added to the mixture, and then the resulting mixture was stirred for 6 hours. At this point in time, the polymerization/imidization had been completed in the earlier step.

Lastly, 4.56 g (30.0 mmol) of DABA and 30.0 g of triglyme were added to the reaction mixture solution, and then the resulting mixture was stirred for 12 hours. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was a clear, brown solution. The viscosity stability was determined, which revealed that the polyimide siloxane solution had a constant viscosity of 10 Pa·s after 30 days.

To the polyimide siloxane solution (composition) were added 1.0 parts by weight of an epoxy compound, EPIKOTE 157S70 (trademark of Mitsubishi Chemical Corporation), 0.65 parts by weight of an epoxy compound, YX4000HK (trademark of Mitsubishi Chemical Corporation), 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 50 wt %, and then the resulting mixture was stirred and homogeneously mixed, to provide a heat-curable polyimide siloxane composition.

The heat-curable polyimide siloxane composition had a thixo ratio of 1.9. The viscosity stability was determined, which revealed that the heat-curable polyimide siloxane composition had a substantially constant viscosity of 17 Pa·s after 30 days.

Example 2

In a 500 mL glass separable flask were placed 61.79 g (210.0 mmol) of a-BPDA and 103.3 g of triglyme as a solvent. And then, a-BPDA was dissolved in the solvent at room temperature under a nitrogen stream. After the resulting mixture was heated up to 80° C., 122.24 g (145.0 mmol) of DAPSi and 30.0 g of triglyme were added to the mixture. The resulting mixture was stirred for 1 hour, and then heated up to 170° C., and stirred for 1 hour at the temperature while removing water. Subsequently, 13.59 g (33.0 mmol) of BAPP and 30.0 g of triglyme were added to the mixture, and then the resulting mixture was stirred for 20 hours. At this point in time, the polymerization/imidization had been completed in the earlier step.

Lastly, 8.29 g (29.0 mmol) of MDAA and 30.0 g of triglyme were added to the reaction mixture solution, and then the resulting mixture was stirred for 20 hours. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was a clear, brown solution. The viscosity stability was determined, which revealed that the polyimide siloxane solution had a constant viscosity of 61 Pa·s after 30 days.

To the polyimide siloxane solution (composition) were added 1.0 parts by weight of an epoxy compound, EPIKOTE 157S70, 0.65 parts by weight of an epoxy compound, YX4000HK, 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 60 wt %, and then the resulting mixture was stirred and homogeneously mixed, to provide a heat-curable polyimide siloxane composition.

The heat-curable polyimide siloxane composition had a thixo ratio of 3.2. The viscosity stability was determined, which revealed that the heat-curable polyimide siloxane composition had a substantially constant viscosity of 26 Pa·s after 30 days.

Example 3

In a 500 mL glass separable flask were placed 59.43 g (202.0 mmol) of a-BPDA and 170.0 g of triglyme as a solvent. And then, a-BPDA was dissolved in the solvent at room temperature under a nitrogen stream. After the resulting mixture was heated up to 80° C., 114.8 g (140.0 mmol) of DAPSi and 35.0 g of triglyme were added to the mixture. The resulting mixture was stirred for 1 hour, and then heated up to 170° C., and stirred for 6 hours at the temperature while removing water. Subsequently, 20.69 g (50.4 mmol) of BAPP and 35.0 g of triglyme were added to the mixture, and then the resulting mixture was stirred for 6 hours. At this point in time, the polymerization/imidization had been completed in the earlier step.

Lastly, 1.46 g (9.6 mmol) of DABA and 30.0 g of triglyme were added to the reaction mixture solution, and then the resulting mixture was stirred for 12 hours. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was a clear, brown solution. The viscosity stability was determined, which revealed that the polyimide siloxane solution had a constant viscosity of 11 Pa·s after 30 days.

To the polyimide siloxane solution (composition) were added 1.0 parts by weight of an epoxy compound, EPIKOTE 157S70, 0.65 parts by weight of an epoxy compound, YX4000HK, 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 40 wt %, and then the resulting mixture was stirred and homogeneously mixed, to provide a heat-curable polyimide siloxane composition.

The heat-curable polyimide siloxane composition had a thixo ratio of 1.7. The viscosity stability was determined, which revealed that the heat-curable polyimide siloxane composition had a substantially constant viscosity of 16 Pa·s after 30 days.

Comparative Example 1

In a 500 mL glass separable flask were placed 59.43 g (202.0 mmol) of a-BPDA and 170.0 g of triglyme as a solvent. And then, a-BPDA was dissolved in the solvent at room temperature under a nitrogen stream. After the resulting mixture was heated up to 80° C., 114.8 g (140.0 mmol) of DAPSi and 30.0 g of triglyme were added, and then 12.32 g (30.0 mmol) of BAPP, 4.56 g (30.0 mmol) of DABA and 70.0 g of triglyme were added to the mixture. The resulting mixture was stirred for 1 hour, and then heated up to 170° C., and stirred for 12 hours at the temperature while removing water. At this point in time, the polymerization/imidization had been completed. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was turbid. The viscosity stability was determined, which revealed that the polyimide siloxane solution had an increased viscosity of 25 Pa·s after 30 days, while having a viscosity of 12 Pa·s after 1 day.

To the polyimide siloxane solution (composition) were added 1.0 parts by weight of an epoxy compound, EPIKOTE 157S70, 0.65 parts by weight of an epoxy compound, YX4000HK, 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 50 wt %, and then the resulting mixture was stirred and homogeneously mixed, to provide a heat-curable polyimide siloxane composition.

The heat-curable polyimide siloxane composition had a thixo ratio of 2.4. The viscosity stability was determined, which revealed that the heat-curable polyimide siloxane composition had an increased viscosity of 40 Pa·s after 30 days, while having a viscosity of 20 Pa·s after 1 day.

Comparative Example 2

In a 500 mL glass separable flask were placed 59.43 g (202.0 mmol) of a-BPDA and 170.0 g of triglyme as a solvent. And then, a-BPDA was dissolved in the solvent at room temperature under a nitrogen stream. After the resulting mixture was heated up to 80° C., 114.8 g (140.0 mmol) of DAPSi and 30.0 g of triglyme were added to the mixture. The resulting mixture was stirred for 1 hour, and then heated up to 170° C., and stirred for 6 hours at the temperature while removing water. Subsequently, 12.32 g (30.0 mmol) of BAPP, 4.56 g (30.0 mmol) of DABA and 70.0 g of triglyme were added to the mixture, and then the resulting mixture was stirred for 12 hours. At this point in time, the polymerization/imidization had been completed. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was a clear, brown solution. The viscosity stability was determined, which revealed that the polyimide siloxane solution had an increased viscosity of 19 Pa·s after 30 days, while having a viscosity of 9 Pa·s after 1 day.

To the polyimide siloxane solution (composition) were added 1.0 parts by weight of an epoxy compound, EPIKOTE 157S70, 0.65 parts by weight of an epoxy compound, YX4000HK, 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 50 wt %, and then the resulting mixture was stirred and homogeneously mixed, to provide a heat-curable polyimide siloxane composition.

The heat-curable polyimide siloxane composition had a thixo ratio of 2.2. The viscosity stability was determined, which revealed that the heat-curable polyimide siloxane composition had an increased viscosity of 35 Pa·s after 30 days, while having a viscosity of 19 Pa·s after 1 day.

Comparative Example 3

In a 500 mL glass separable flask were placed 61.79 g (210.0 mmol) of a-BPDA and 172.5 g of triglyme as a solvent. And then, a-BPDA was dissolved in the solvent at room temperature under a nitrogen stream. After the resulting mixture was heated up to 80° C., 122.24 g (145.0 mmol) of DAPSi and 40.0 g of triglyme were added, and then 13.59 g (33.0 mmol) of BAPP, 8.29 g (29.0 mmol) of MBAA and 80.0 g of triglyme were added to the mixture. The resulting mixture was stirred for 1 hour, and then heated up to 170° C., and stirred for 12 hours at the temperature while removing water. At this point in time, the polymerization/imidization had been completed. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was turbid. The viscosity stability was determined, which revealed that the polyimide siloxane solution had an increased viscosity of 25 Pa·s after 30 days, while having a viscosity of 13 Pa·s after 1 day.

To the polyimide siloxane solution (composition) were added 1.0 parts by weight of an epoxy compound, EPIKOTE 157S70, 0.65 parts by weight of an epoxy compound, YX4000HK, 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 50 wt %, and then the resulting mixture was stirred and homogeneously mixed, to provide a heat-curable polyimide siloxane composition.

The heat-curable polyimide siloxane composition had a thixo ratio of 2.1. The viscosity stability was determined, which revealed that the heat curable polyimide siloxane composition had an increased viscosity of 30 Pa·s after 30 days, while having a viscosity of 18 Pa·s after 1 day.

Comparative Example 4

In a 500 mL glass separable flask were placed 59.43 g (202.0 mmol) of a-BPDA and 170.0 g of triglyme as a solvent. And then, a-BPDA was dissolved in the solvent at room temperature under a nitrogen stream. After the resulting mixture was heated up to 80° C., 114.8 g (140.0 mmol) of DAPSi and 35.0 g of triglyme were added to the mixture. The resulting mixture was stirred for 1 hour, and then heated up to 170° C., and stirred for 6 hours at the temperature while removing water. Subsequently, 4.56 g (30.0 mmol) of DABA and 35.0 g of triglyme were added to the mixture, and then the resulting mixture was stirred for 6 hours. At this point in time, the polymerization/imidization had been completed in the earlier step.

Lastly, 12.32 g (30.0 mmol) of BAPP and 30.0 g of triglyme were added to the reaction mixture solution, and then the resulting mixture was stirred for 12 hours. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was a clear, brown solution. The viscosity stability was determined, which revealed that the polyimide siloxane solution had an increased viscosity of 28 Pa·s after 30 days, while having a viscosity of 19 Pa·s after 1 day.

To the polyimide siloxane solution (composition) were added 1.0 parts by weight of an epoxy compound, EPIKOTE 157S70, 0.65 parts by weight of an epoxy compound, YX4000HK, 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 50 wt %, and then the resulting mixture was stirred and homogeneously mixed, to provide a heat-curable polyimide siloxane composition.

The heat-curable polyimide siloxane composition had a thixo ratio of 2.0. The viscosity stability was determined, which revealed that the heat-curable polyimide siloxane composition had an increased viscosity of 40 Pa·s after 30 days, while having a viscosity of 25 Pa·s after 1 day.

Comparative Example 5

In a 500 mL glass separable flask were placed 61.79 g (210.0 mmol) of a-BPDA and 103.3 g of triglyme as a solvent. And then, a-BPDA was dissolved in the solvent at room temperature under a nitrogen stream. After the resulting mixture was heated up to 80° C., 122.24 g (145 mmol) of DAPSi and 30 g of triglyme were added to the mixture. The resulting mixture was stirred for 1 hour, and then heated up to 170° C., and stirred for 1 hour at the temperature while removing water. Subsequently, 13.59 g (33.0 mmol) of BAPP, 8.29 g (29.0 mmol) of MBAA and 60.0 g of triglyme were added to the mixture, and then the resulting mixture was stirred for 20 hours. At this point in time, the polymerization/imidization had been completed. Subsequently, 5.0 g of triglyme to which water was added (the amount of water corresponds to 2000 ppm relative to the weight of the polyimide siloxane) was added to the mixture, and then the resulting mixture was stirred and cooled down, to provide a polyimide siloxane solution (composition).

The polyimide siloxane solution (composition) was a clear, brown solution. The viscosity stability was determined, which revealed that the polyimide siloxane solution had an increased viscosity of 60 Pa·s after 30 days, while having a viscosity of 55 Pa·s after 1 day.

To the polyimide siloxane solution (composition) were added 1.0 parts by weight of an epoxy compound, EPIKOTE 157S70, 0.65 parts by weight of an epoxy compound, YX4000HK, 10.0 parts by weight of a fine powdery silica, Aerosil 50, and 80.0 parts by weight of a talc, SG-95 relative to 100 parts by weight of the polyimide siloxane. Furthermore, triglyme was added to the mixture so that the solid content would be 60 wt %, and then the resulting mixture was stirred and homogeneously mixed, to provide a heat-curable polyimide siloxane composition.

The heat-curable polyimide siloxane composition had a thixo ratio of 3.2. The viscosity stability was determined, which revealed that the heat-curable polyimide siloxane composition had an increased viscosity of 38 Pa·s after 30 days, while having a viscosity of 28 Pa·s after 1 day.

The features of the production processes (reaction sequence of the amine component) and the evaluation results for the obtained solution compositions in the examples as described above are shown in Table 1. The results clearly demonstrate that the polyimide siloxane solution compositions produced by the production processes of the present invention have further improved long-term viscosity stability.

In addition, the carboxylic acid equivalence (polar group equivalence) may be used as an index of the crosslink density obtainable by curing a curable solution composition, which is prepared from a polyimide siloxane solution composition according to the present invention. The carboxylic acid equivalence may be preferably from 2500 to 15000 because the sufficient cure properties may be provided (e.g. solvent resistance may be provided) and cure shrinkage may be suitably controlled (the curling, for example, may be suitably controlled when cured). According to the present invention, further improved long-term viscosity stability may be achieved over a wide range of density of carboxylic acid (polar group) extending from high-density to low-density (from low to high carboxylic acid equivalence, i.e. polar group equivalence), including the preferred range of carboxylic acid equivalence (polar group equivalence) as described above.

In addition, a curable polyimide siloxane solution composition produced according to the present invention may have an excellent thixo ratio, which is important to printing properties.

In Examples and Comparative Examples as described above, the mixture prepared by adding a small amount of water to the solvent was added to the reaction mixture solution, which was then stirred and cooled down in the final stage of the production of the polyimide siloxane solution composition in order to avoid apparent thickening (higher viscosity) of the reaction mixture solution, which is caused by various components having high polarity, including a diamine having a polar group, involved in the polymerization/imidization reaction to provide a polyimide siloxane according to the present invention, resulting in difficulty in controlling, for example, the stirring. In the process for producing a polyimide siloxane solution composition by polymerizing/imidizing a tetracarboxylic acid component and a diamine component which comprises a diamine having a polar group, water may be preferably added to the reaction mixture, which is prepared by polymerizing/imidizing the tetracarboxylic acid component and the diamine component, in an amount of from about 500 ppm to about 5000 ppm relative to the weight of the polyimide siloxane at a high temperature of 100° C. or higher in the final stage (the final stage of the polymerization/imidization or after the completion of the polymerization/imidization) so as to control the solution viscosity, although the present invention is not limited to this embodiment.

TABLE 1

|  | Example 1 | Example 2 | Example 3 |
|---|---|---|---|
| Polyimide siloxane solution Features of production process (Reaction sequence of the amine component, expressed in figures) |  |  |  |
| DAPSi | 1 | 1 | 1 |
| BAPP | 2 | 2 | 2 |
| DABA | 3 |  | 3 |
| MBAA |  | 3 |  |
| Appearance of solution (visual observation) | Clear | Clear | Clear |
| Solid content (wt %) | 40 | 50 | 40 |
| Carboxylic acid equivalence | 3000 | 3500 | 10000 |
| Viscosity stability |  |  |  |
| 1 day after production (Pa · s at 25° C.) | 10 | 60 | 11 |
| 30 days after production (Pa · s at 25° C.) | 10 | 61 | 11 |
| Heat-curable polyimide siloxane solution composition |  |  |  |
| Solid content (wt %) | 50 | 60 | 50 |
| Thixo ratio | 1.9 | 3.2 | 1.7 |
| Viscosity stability |  |  |  |
| 1 day after production (Pa · s at 25° C.) | 16 | 25 | 16 |
| 30 days after production (Pa · s at 25° C.) | 17 | 26 | 18 |

|  | Comparative Example 1 | Comparative Example 2 | Comparative Example 3 | Comparative Example 4 | Comparative Example 5 |
|---|---|---|---|---|---|
| Polyimide siloxane solution Features of production process (Reaction sequence of the amine component, expressed in figures) |  |  |  |  |  |
| DAPSi | 1 | 1 | 1 | 1 | 1 |
| BAPP | 1 | 2 | 1 | 3 | 2 |

TABLE 1-continued

| | | | | | |
|---|---|---|---|---|---|
| DABA | 1 | 2 | | 2 | |
| MBAA | | | 1 | | 2 |
| Appearance of solution (visual observation) | Turbid | Clear | Turbid | Clear | Clear |
| Solid content (wt %) | 40 | 40 | 40 | 40 | 50 |
| Carboxylic acid equivalence | 2900 | 3000 | 3100 | 3000 | 3300 |
| Viscosity stability | | | | | |
| 1 day after production (Pa·s at 25° C.) | 12 | 9 | 13 | 19 | 55 |
| 30 days after production (Pa·s at 25° C.) | 25 | 19 | 25 | 28 | 60 |
| Heat-curable polyimide siloxane solution composition | | | | | |
| Solid content (wt %) | 50 | 50 | 50 | 50 | 60 |
| Thixo ratio | 2.4 | 2.2 | 2.1 | 2.0 | 3.3 |
| Viscosity stability | | | | | |
| 1 day after production (Pa·s at 25° C.) | 20 | 19 | 18 | 25 | 28 |
| 30 days after production (Pa·s at 25° C.) | 40 | 35 | 30 | 40 | 38 |

In the Table, the solid content of the polyimide siloxane solution (composition) means the concentration of polymer component(s), excluding an additive such as a filler; and the solid content of the heat-curable polyimide siloxane solution composition means the total concentration of all solid components, including an additive such as a filler.

INDUSTRIAL APPLICABILITY

According to the present invention, there may be provided a process for producing a polyimide siloxane solution composition having further improved long-term viscosity stability; and a polyimide siloxane solution composition having further improved long-term viscosity stability.

The invention claimed is:

1. A process for producing a polyimide siloxane solution composition by polymerizing/imidizing a tetracarboxylic acid component and a diamine component consisting of (a) a diaminopolysiloxane, (b) a diamine having a carboxyl group and (c) a diamine other than (a) and (b) in a solvent, comprising steps of:
   polymerizing/imidizing the tetracarboxylic acid component and the diaminopolysioxane component (a) to provide a reaction mixture solution;
   adding the diamine component (c) to the reaction mixture solution and polymerizing/imidizing the mixture; and
   adding (b) the diamine having a carboxyl group last to the reaction mixture solution, and polymerizing/imidizing the mixture.

2. A process for producing a polyimide siloxane solution composition as claimed in claim 1, wherein the polyimide siloxane solution composition obtained has a solid content of 20 wt % or more.

3. A process for producing a polyimide siloxane solution composition as claimed in claim 1, wherein (c) the diamine other than (a) and (b) is an aromatic diamine having a plurality of benzene rings.

4. A polyimide siloxane solution composition produced by a production process as claimed in claim 1.

5. A polyimide siloxane solution composition comprising a polyimide siloxane, which is prepared by polymerizing/imidizing a tetracarboxylic acid component and a diamine component consisting of (a) a diaminopolysiloxane, (b) a diamine having a carboxyl group and (c) a diamine other than (a) and (b), and a solvent; wherein
   the polyimide siloxane solution composition has a polyimide siloxane solid content of from 30 wt % to 60 wt %; and
   the polyimide siloxane solution composition has a percentage change in viscosity of less than ±9% when the viscosity is measured after the composition is left at a temperature of 25° C. for 30 days from the point of production, this percentage being expressed relative to the viscosity measured after the composition is left at a temperature of 25° C. for 1 day from the point of production,
   wherein the polyimide siloxane solution composition is produced by a production process as claimed in claim 1.

6. A polyimide siloxane solution composition comprising a polyimide siloxane, which is prepared by polymerizing/imidizing a tetracarboxylic acid component and a diamine component consisting of (a) a diaminopolysiloxane, (b) a diamine having a carboxyl group and (c) a diamine other than (a) and (b), and a solvent; wherein
   the polyimide siloxane solution composition has a polyimide siloxane solid content of from 30 wt % to 60 wt %; and
   the polyimide siloxane solution composition has an absolute value of the change in viscosity of less than 5 Pa·s when the viscosity is measured after the composition is left at a temperature of 25° C. for 30 days from the point of production, this absolute value being expressed relative to the viscosity measured after the composition is left at a temperature of 25° C. for 1 day from the point of production,
   wherein the polyimide siloxane solution composition is produced by a production process as claimed in claim 1.

7. A curable polyimide siloxane solution composition comprising a polyimide siloxane solution composition as claimed in claim 4, and a curable resin.

8. A curable polyimide siloxane solution composition as claimed in claim 7, wherein the curable resin is at least one selected from the group consisting of an epoxy resin, a polyvalent isocyanate, a phenol resin and a guanamine resin.

9. A curable polyimide siloxane solution composition comprising a polyimide siloxane solution composition as claimed in claim 5, and a curable resin.

10. A curable polyimide siloxane solution composition as claimed in claim 9, wherein the curable resin is at least one selected from the group consisting of an epoxy resin, a polyvalent isocyanate, a phenol resin and a guanamine resin.

11. A curable polyimide siloxane solution composition comprising a polyimide siloxane solution composition as claimed in claim 6, and a curable resin.

12. A curable polyimide siloxane solution composition as claimed in claim 11, wherein the curable resin is at least one selected from the group consisting of an epoxy resin, a polyvalent isocyanate, a phenol resin and a guanamine resin.

* * * * *